(12) United States Patent
Shmueli Friedland et al.

(10) Patent No.: US 11,697,370 B2
(45) Date of Patent: Jul. 11, 2023

(54) AUGMENTED AUDIO OUTPUT BY AN ELECTRIC VEHICLE

(71) Applicant: GM Global Technology Operations LLC, Detroit, MI (US)

(72) Inventors: Yael Shmueli Friedland, Tel Aviv (IL); Jigar Kapadia, Bloomfield Hills, MI (US); Zahy Bnaya, Tel Aviv (IL); Omer Tsimhoni, Bloomfield Hills, MI (US); Asaf Degani, Raanana (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/160,614

(22) Filed: Jan. 28, 2021

(65) Prior Publication Data
US 2022/0234499 A1    Jul. 28, 2022

(51) Int. Cl.
*B60Q 9/00* (2006.01)
*G06F 3/16* (2006.01)
*G10K 15/02* (2006.01)
*B60W 30/095* (2012.01)
*B60R 21/0134* (2006.01)
*B60R 21/36* (2011.01)
*B60Q 5/00* (2006.01)

(52) U.S. Cl.
CPC ............ *B60Q 9/00* (2013.01); *G06F 3/165* (2013.01); *G10K 15/02* (2013.01); *B60Q 5/00* (2013.01); *B60R 21/0134* (2013.01); *B60R 21/36* (2013.01); *B60W 30/095* (2013.01); *B60W 30/0953* (2013.01); *B60W 2554/801* (2020.02); *B60W 2554/802* (2020.02); *B60W 2554/804* (2020.02)

(58) Field of Classification Search
CPC .. B60Q 9/00; B60Q 5/00; G06F 3/165; G10K 15/02; B60W 30/0953; B60W 2554/4059; B60W 2554/801; B60W 2554/802; B60W 2554/804; B60W 30/095; B60W 30/09; B60R 21/0134; B60R 21/00; B60R 21/36
See application file for complete search history.

(56) References Cited

U.S. PATENT DOCUMENTS

| 8,836,384 | B1 * | 9/2014 | Oh .................. H03K 19/00346 327/306 |
| 10,497,255 | B1 * | 12/2019 | Shmueli Friedland ..................... B60W 30/0956 |
| 2006/0074649 | A1 * | 4/2006 | Pachet ..................... G10H 7/02 704/229 |
| 2006/0186702 | A1 * | 8/2006 | Kisanuki ................. B60R 21/36 701/45 |

(Continued)

FOREIGN PATENT DOCUMENTS

WO    WO-2021104833 A1 *    6/2021    ........ B60W 30/0953

*Primary Examiner* — Matthew A Eason
*Assistant Examiner* — Kuassi A Ganmavo
(74) *Attorney, Agent, or Firm* — Cantor Colburn LLP

(57) ABSTRACT

Systems and methods to augment audio output in an electric vehicle (EV) include obtaining inputs from one or more sensors. The inputs include information about the EV and about one or more persons outside the EV. A current scenario is defined based on the inputs. Whether the current scenario matches a predefined scenario among a set of predefined scenarios is determined, and augmented audio output is produced according to the predefined scenario.

20 Claims, 2 Drawing Sheets

(56) References Cited

U.S. PATENT DOCUMENTS

| | | | |
|---|---|---|---|
| 2008/0312832 A1* | 12/2008 | Greene | G08G 1/165 |
| | | | 701/301 |
| 2010/0305858 A1* | 12/2010 | Richardson | G06N 7/02 |
| | | | 706/52 |
| 2011/0199199 A1* | 8/2011 | Perkins | B60Q 9/008 |
| | | | 340/435 |
| 2013/0261887 A1 | 10/2013 | Raz et al. | |
| 2013/0278442 A1* | 10/2013 | Rubin | H04J 3/1694 |
| | | | 340/905 |
| 2015/0035685 A1* | 2/2015 | Strickland | B60Q 1/525 |
| | | | 340/901 |
| 2015/0091740 A1* | 4/2015 | Bai | B60K 35/00 |
| | | | 340/901 |
| 2017/0096099 A1* | 4/2017 | Matsubara | G10K 11/17855 |
| 2017/0113685 A1* | 4/2017 | Sendhoff | B60W 30/09 |
| 2017/0120814 A1* | 5/2017 | Kentley | B60C 5/008 |
| 2017/0123754 A1* | 5/2017 | Kwon | G10K 15/02 |
| 2017/0213149 A1* | 7/2017 | Micks | H04R 29/00 |
| 2017/0282790 A1* | 10/2017 | Pan | B60T 17/22 |
| 2017/0358203 A1* | 12/2017 | MacNeille | B60W 50/14 |
| 2018/0050635 A1* | 2/2018 | Vincent | H04R 1/323 |
| 2018/0137750 A1* | 5/2018 | MacNeille | B60Q 5/008 |
| 2018/0361925 A1* | 12/2018 | Rowell | B60Q 1/525 |

\* cited by examiner

AUGMENTED AUDIO OUTPUT BY AN ELECTRIC VEHICLE

INTRODUCTION

The subject disclosure relates to augmented audio output by an electric vehicle (EV).

An EV (e.g., automobile, truck, construction equipment, farm equipment, automated factory equipment) may be operated partially (i.e., in the case of a hybrid) or completely by electric power. An EV or a hybrid operating on electric power does not produce the noise associated with most vehicles that include internal combustion engines. Generally, the only noise an EV generates is caused by wind resistance or tire noise, and even these sounds are only produced at moderate to high speeds. A consequence of this silence is that pedestrians and cyclists are not warned of an EV approaching at low speeds. This can be especially problematic for visually impaired pedestrians. Artificial sound may therefore be a requirement for EVs in many jurisdictions. The audio outputs, referred to as auditory icons, are artificially generated but designed to sound natural (e.g., engine revving, brake being applied). Sometimes, these standard audio outputs do not have the intended effect on pedestrian or cyclist behavior in order to enhance safety. Accordingly, it is desirable to provide augmented audio output by an EV.

SUMMARY

In one exemplary embodiment, a method of augmenting audio output in an electric vehicle (EV) includes obtaining inputs from one or more sensors. The inputs include information about the EV and about one or more persons outside the EV. The method also includes defining a current scenario based on the inputs and determining whether the current scenario matches a predefined scenario among a set of predefined scenarios. The augmented audio output is produced according to the predefined scenario.

In addition to one or more of the features described herein, the obtaining the inputs includes obtaining information about a potential conflict in a path of the EV and a path of one of the one or more persons, the information being based on lateral and longitudinal distance between the EV and the one of the one or more persons and the information including a time to the potential conflict.

In addition to one or more of the features described herein, the obtaining the inputs includes obtaining information about current conditions, the current conditions including traction and visibility.

In addition to one or more of the features described herein, obtaining the information about the one or more persons includes obtaining indications of ability and awareness.

In addition to one or more of the features described herein, the current scenario is expressed as a hexadecimal value.

In addition to one or more of the features described herein, the producing the augmented audio output includes modifying a standard audio output, the standard audio output being defined by attack, a time for initial ramp up from 0 to a peak audio level, decay, a time to reach a sustained level, sustain, an audio level during a main sequence, and release, a time for final ramp down from sustain back to 0 (ADSR) characteristics. The modifying the standard audio output includes changing a start time of the standard audio output, changing a volume of the standard audio output, or changing a pitch, timbre, cadence, or the ADSR characteristics of the standard audio output.

In addition to one or more of the features described herein, the producing the augmented audio output includes adding earcons, which are audio representations additional to standard audio outputs by the EV.

In addition to one or more of the features described herein, the method also includes, based on the current scenario matching two or more of the set of predefined scenarios, selecting the augmented output corresponding with one of the two or more of the set of predefined scenarios with a highest risk level value.

In addition to one or more of the features described herein, the defining the current scenario includes selecting a default value to represent one or more parameters for which there is no corresponding one of the inputs.

In addition to one or more of the features described herein, the producing the augmented audio output includes emitting a sound outside the EV and cancelling the sound within the EV.

In another exemplary embodiment, a system to augment audio output in an electric vehicle (EV) includes one or more sensors, and a controller to obtain inputs from one or more sensors. The inputs include information about the EV and about one or more persons outside the EV. The controller also defines a current scenario based on the inputs and determines whether the current scenario matches a predefined scenario among a set of predefined scenarios. Augmented audio output is produced according to the predefined scenario.

In addition to one or more of the features described herein, the controller obtains the inputs by obtaining information about a potential conflict in a path of the EV and a path of one of the one or more persons, the information being based on lateral and longitudinal distance between the EV and the one of the one or more persons and the information including a time to the potential conflict.

In addition to one or more of the features described herein, the controller obtains the inputs by obtaining information about current conditions, the current conditions including traction and visibility.

In addition to one or more of the features described herein, the controller obtains the information about the one or more persons by obtaining indications of ability and awareness.

In addition to one or more of the features described herein, the current scenario is expressed as a hexadecimal value.

In addition to one or more of the features described herein, the controller produces the augmented audio output by modifying a standard audio output, the standard audio output being defined by attack, a time for initial ramp up from 0 to a peak audio level, decay, a time to reach a sustained level, sustain, an audio level during a main sequence, and release, a time for final ramp down from sustain back to 0 (ADSR) characteristics. Modifying the standard audio output includes changing a start time of the standard audio output, changing a volume of the standard audio output, or changing a pitch, timbre, cadence, or the ADSR characteristics of the standard audio output.

In addition to one or more of the features described herein, the controller produces the augmented audio output by adding earcons, which are audio representations additional to standard audio outputs by the EV.

In addition to one or more of the features described herein, based on the current scenario matching two or more of the set of predefined scenarios, the controller selects the augmented output corresponding with one of the two or more of the set of predefined scenarios with a highest risk level value.

In addition to one or more of the features described herein, the controller defines the current scenario by selecting a default value to represent one or more parameters for which there is no corresponding one of the inputs.

In addition to one or more of the features described herein, the controller produces the augmented audio output by emitting a sound outside the EV and cancelling the sound within the EV.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
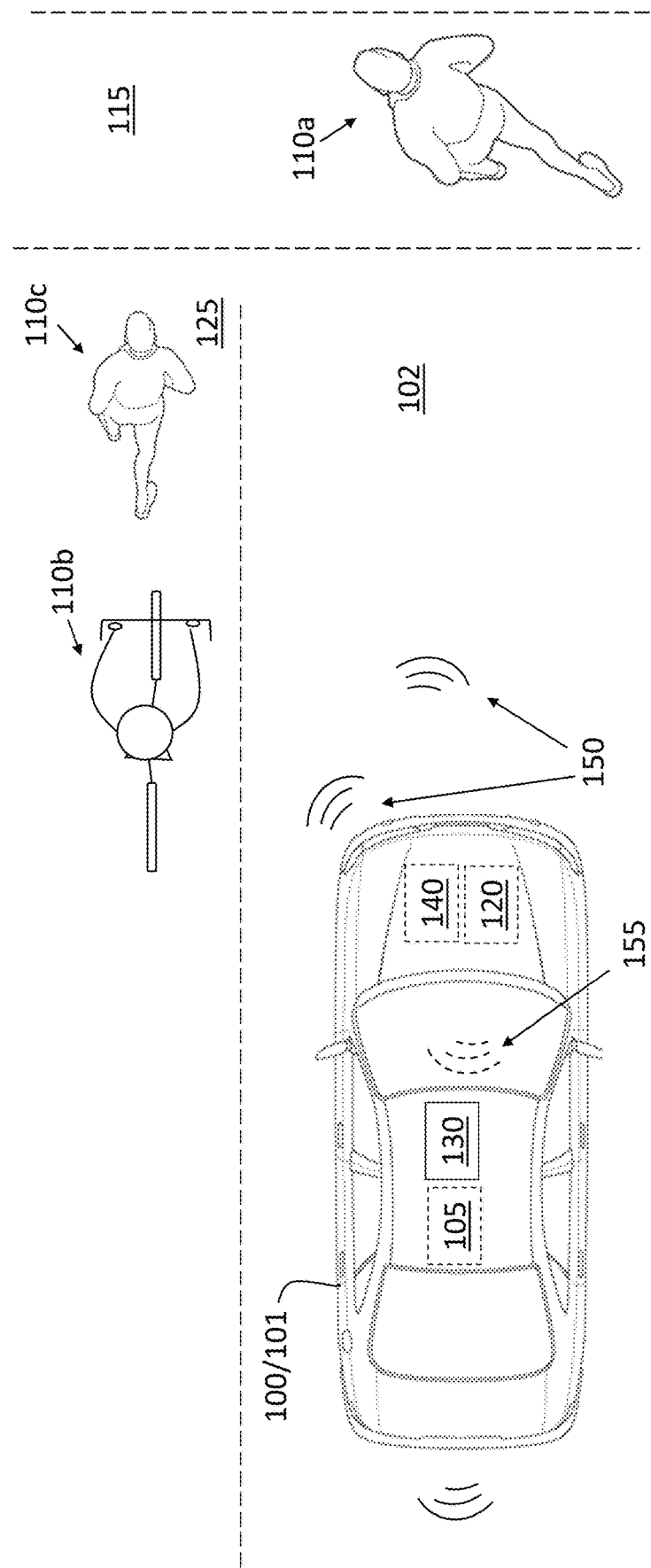
FIG. 1 is a block diagram of exemplary scenarios giving rise to manipulation of audio output by an electric vehicle (EV)

The following description is merely exemplary in nature and is not intended to limit the present disclosure, its application or uses. It should be understood that throughout the drawings, corresponding reference numerals indicate like or corresponding parts and features.

As previously noted, the fact that an EV may be silent, especially at low speeds, may pose a safety concern for pedestrians and cyclists. The EV may be semi-autonomous, with automated operation of at least the audio output, or autonomous. Thus, an EV may include an acoustic vehicle alert system (AVAS) that provides an audio output at low speed whose pitch changes with speed. The AVAS may operate at speeds on the order of 0 to 32 kilometers per hour (kph), for example. Another system called an electric vehicle sound enhancement (EVSE) system may provide audio output at higher speeds than those at which the AVAS is implemented.

Embodiments of the systems and methods detailed herein relate to augmented audio output by an EV. Specifically, the standard audio output of a system like the AVAS or EVSE may be augmented. That is, the AVAS and EVSE system output standard audio is based on vehicle operation, and this standard audio is augmented according to one or more embodiments. The standard audio envelope, which describes change in sound over time, is defined by attack (i.e., time for initial ramp up from 0 to the peak audio level), decay (i.e., time to reach a sustained level from the attack level), sustain (i.e., the audio level during the main sequence), and release (i.e., time for final ramp down from sustain back to 0) (ADSR). The specific envelope that is output by the AVAS or EVSE system for a given vehicle operation differs. According to one or more embodiments, the current scenario is determined, and the corresponding standard envelope is augmented. The augmentation may be based on a mapping of the current scenario to a given augmented envelope, for example. The augmentation may take the form of a modification to a timing or audio aspect of the ADSR that defines the standard envelope (e.g., change in start time (attack), change in pitch or volume (sustain)) or may take the form of an addition.

In certain scenarios, the augmentation may be to elicit calm (i.e., for reassurance) while in other scenarios, the augmentation may be to elicit concern (i.e., for warning). For example, when a visually impaired pedestrian is entering or walking within a crosswalk, the audio output of an approaching EV (e.g., the AVAS output) may be augmented to convey harder braking than is actually implemented. As a result, the pedestrian is reassured while the passengers of the EV are not actually subjected to the harder braking. As another example, when a cyclist is ahead, the audio output of a following EV may be augmented (e.g., the EVSE output) to convey higher speed or a faster approach than is true in order to serve as a warning against a maneuver into the vehicle lane by the cyclist.

As detailed, the start of the audio output (i.e., from how far away) may be modified and/or the audio output itself (e.g., tone, volume) may be modified from the standard output. For explanatory purposes, the AVAS or EVSE output is regarded as the standard (i.e., un-modified) audio output. Additionally, in some circumstances, additions may be made to the standard output. That is, the audio output may be augmented with earcons, which are audio representations that are analogous to graphical representations (i.e., icons) may be added as part of the augmented audio output. Unlike augmentations of standard audio outputs, these earcons are not sounds that a non-EV vehicle would produce.

In accordance with an exemplary embodiment, FIG. 1 is a block diagram of exemplary scenarios giving rise to manipulation of audio output by an EV 100. The exemplary EV 100 shown in FIG. 1 is an automobile 101. People 110 shown in FIG. 1 include a pedestrian 110a in a crosswalk 115 and a cyclist 110b and a jogger 110c in a bike lane 125. Generally, people 110 (i.e., one or more persons) refers to anyone around the EV 100 who is not within a structure (e.g., building) or other vehicle (e.g., motorcycle, automobile, truck) that travels the roadway (i.e., the driving lane 102 or another lane) in a similar manner to the vehicle 100. Thus, in addition to cyclists, pedestrians, and joggers, children in strollers, those using wheelchairs or other mobility products, skaters, and the like are all regarded as people 110 for purposes of augmentation of audio output 150, 155.

The EV 100 may include one or more sensors 130 (e.g., radar system, lidar system, camera) to detect and locate the people 110 around the EV 100. The EV 100 may also include one or more sensors 140 (e.g., camera and gesture detection processor, inertial measurement unit (IMU), global navigation satellite system (GNSS) such as global positioning system (GPS)) to obtain information about the EV 100 itself or its driver in the passenger compartment 105. The numbers and positions of the sensors 130, 140 are not intended to be limited by the exemplary illustration. Further, the sensors 130, 140 are known and not detailed herein.

The EV 100 includes a controller 120 with processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 120 controls audio output 150 outside the EV 100 and audio output 155 within the passenger compartment 105 of the EV 100. According to exemplary embodiments detailed herein, the AVAS, EVSE, or a similar system that includes known audio capability is part of the functionality implemented by the controller 120.

This functionality is augmented by the controller 120 according to one or more embodiments, as detailed with reference to FIG. 2.

As previously noted, this augmentation may involve a modification of the standard output (e.g., of the AVAS or EVSE) in the form of a change in some aspect of the associated ADSR that defines the standard envelope for a given situation. Exemplary modifications may refer to the timing, volume, pitch, timber, cadence, or duration of the standard audio output. As also noted, the augmentation may additionally or alternately involve an addition to the standard output in the form of an earcon. As discussed for the exemplary scenarios illustrated in FIG. 1, for example, the augmentation of standard audio output may be based on the risk level of the current scenario, which is determined based on sensors 130, 140. Non-limiting examples of augmentations used to convey an increase in risk level perceived for a scenario include an increase in volume or pitch. The augmentation may be in the form of a continuous modulation of the ADSR associated with the standard audio output for an ongoing scenario or one in which risk may be increasing. That is, acoustic output may be changed continuously (e.g., increase in tempo, cadence, amplitude modulation).

One of the scenarios illustrated in FIG. 1 involves the pedestrian 110a in the crosswalk 115. The position (i.e., in the crosswalk 115) as well as behavior (e.g., based on image processing) of the pedestrian 110a may be obtained based on sensors 130 and considered as part of the current scenario. The behavior may indicate that the pedestrian 110a is visually impaired or distracted, for example. The EV 100 may be in the process of coming to a stop. This intended action of the EV 100 is also determined. In this case, the augmentation may involve conveying the intended action (i.e., braking) in an exaggerated manner. For example, harder (e.g., faster, more sudden) braking may be conveyed by the audio output 150 to reassure the pedestrian 110a. The augmentation used to convey this harder braking may involve a modulation of the envelope associated with the standard audio output for braking by the vehicle 100, for example. Additionally or alternatively, the augmentation may involve an addition of an earcon. At the same time, audio output 155 within the passenger compartment 105 may cancel the audio output 150 outside the EV 100 so that passengers within the EV 100 are not alarmed or confused by the mismatch between the audio output 150 and the actual behavior of the EV 100.

Another scenario illustrated in FIG. 1 involves the cyclist 110b. The position (i.e., in a bike lane 125, behind a jogger 110c) as well as behavior of the cyclist 110b may be obtained. The behavior (e.g., initiation of a passing maneuver on one or more occasions that is captured by a camera) may indicate impatience to pass the jogger 110c. If the pedestrian 110a were not in the crosswalk 115 ahead, the EV 100 may be in the process of proceeding without slowing or stopping. This intended action of the EV 100 is also determined. That is, a determination of the current scenario involves a determination of the intended action of the EV 100, as well as information about the people 110 in the vicinity. As part of the information about the people 110 in the vicinity of the EV 100, both longitudinal distance and lateral distance between the EV 100 and the people 110 is monitored. These components of the current scenario may indicate potential danger in a given current scenario and, thus, affect augmented audio output. For example, in the exemplary scenario, the lateral distance to the cyclist 110b may be decreasing as the EV 100 approaches (i.e., as longitudinal distance is decreasing). In this case, the augmentation may involve warning the cyclist 110b not to enter the driving lane 102 ahead of the EV 100 in order to pass the jogger 110c. For example, audio output 150 may be provided earlier and louder than a standard output in this situation to give the impression that the EV 100 is closer, thereby discouraging the cyclist 110b from entering the driving lane 102.

Figure 2:
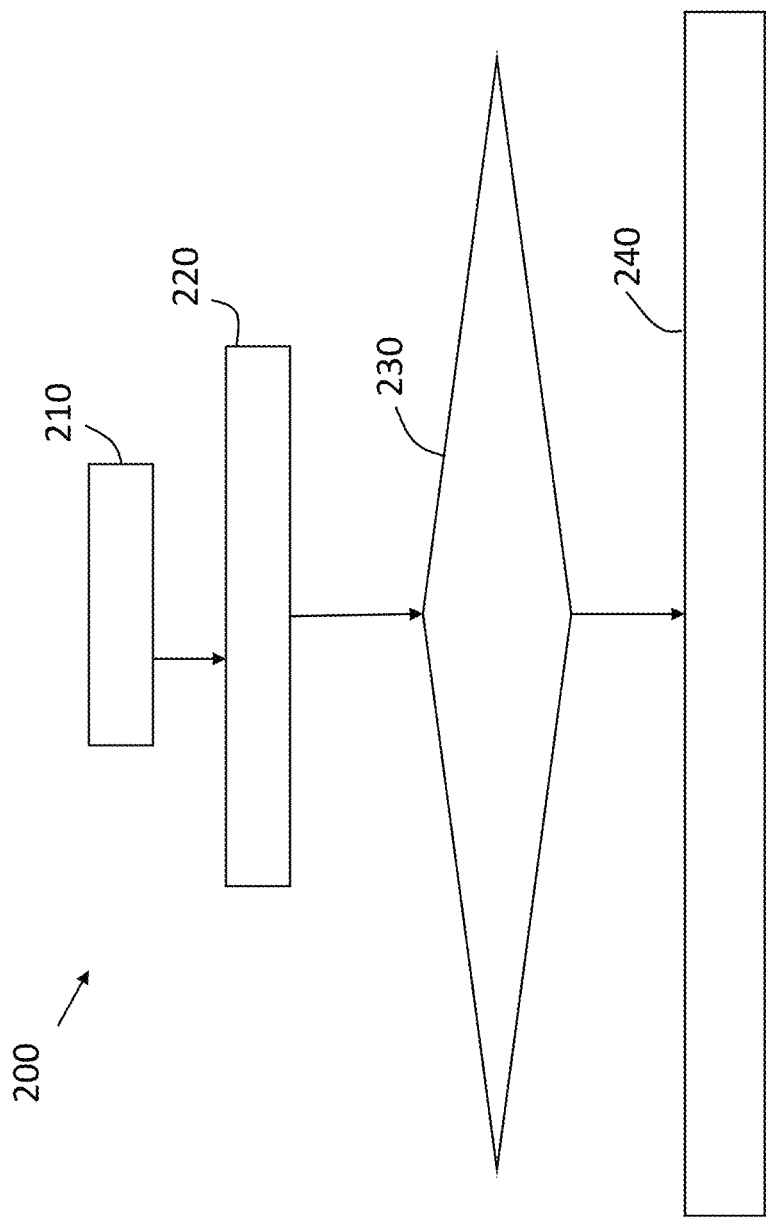
FIG. 2 is a process flow of a method of generating augmented audio output by an EV according to one or more embodiments.

FIG. 2 is a process flow of a method 200 of generating augmented audio output 150, 155 by an EV 100 according to one or more embodiments. At block 210, obtaining inputs includes obtaining information about the EV 100, about the people 110 around the EV 100, about the environment (e.g., conditions that effect visibility), and, in the case of an EV 100 that is not an AV, about the driver. Inputs may be obtained from one or more sensors 130, 140. The inputs are further discussed with reference Table 1.

At block 220, the inputs obtained at block 210 are used to define the current scenario. The current scenario may be defined as a hexadecimal value, for example. When an input needed to define the current scenario is not obtained, a default value may be selected. According to an exemplary embodiment, the default value may be the highest risk value. For example, if a sensor 140 such as a camera is unable to determine an ability of a pedestrian 110a, the pedestrian 110a may be assumed to be blind as a default in order to plan for the highest risk scenario. In addition to the inputs, a risk level value may be defined for each current scenario (and predefined scenario). The risk level value may be based on the highest risk input value or a number of high risk input values, for example. That is, if a jogger is assessed to be an adult but also one wearing earbuds and, thus, with diminished hearing, then the risk level value may be selected according to the diminished hearing rather than the fact that the jogger is an adult between ages 19 and 64.

As an example, a current scenario with the hexadecimal value 000110 may define a cyclist who is an adult with no disability or potential conflicts identified and no gesture or eye contact detected. Each of these input parameters may convey information about the scenario and, consequently, the audio that is warranted. For example, the fact that the cyclist is an adult rather than a child may suggest a particular level or responsiveness and risk aversion. The fact that the cyclist made no gestures or eye contact may suggest a lack of awareness of the EV 100. All of this information defines a particular scenario. The scenarios are further discussed with reference to Table 1. At block 230, a check is done of whether the current scenario matches a predefined scenario. If not, any standard audio output that is associated with the scenario is output without modification or addition and the processes repeat beginning with obtaining inputs at block 210.

If, based on the check at block 230, the current scenario matches a predefined scenario, then the augmented audio output 150, 155 is produced (i.e., generated and emitted) at block 240. A current scenario may match more than one predefined scenario. That is, more than one predefined scenario may have the same hexadecimal value, for example. In that case, the predefined with the highest risk level may be used. At block 240, producing the augmented audio output 150, 155 is according to the predefined scenario that matched the current scenario. More than one predefined scenario may map to the same augmented audio output 150, 155. Some scenarios may result in only audio output 150 outside the EV 100 while other scenarios may additionally involve audio output 155 within the passenger compartment

105. The augmented audio output 150, 155 is further discussed with reference to Table 1.

TABLE 1

Exemplary inputs to generate current scenario.

| Data from sensor | (Information)/Input | Use (effect on augmented audio) |
|---|---|---|
| EV speed | (speed) | part of conflict assessment |
| EV trajectory | (angular direction) | |
| Person-Type | 0: pedestrian/jogger<br>1: cyclist<br>2: scooter | current scenario (augmentation differs by type) |
| Person-Ability | 0: no aid<br>1: cane/crutches<br>guide dog<br>stroller<br>mobility product | current scenario (augmentation may be increased with decreased ability of person) |
| Person-age | 0: 19-64<br>1: other | current scenario (augmentation may be increased for other ages) |
| Person-predicted path | 1: crossing 20 to 60 degrees relative to road or moving along road<br>0: other | part of conflict assessment<br>0: no potential conflict<br>1: potential conflict<br>(augmentation may not be needed if there is no potential for conflict (i.e., collision) between paths of the EV and the person; augmentation may be increased as time to conflict (i.e., collision) decreases) |
| Person-velocity vector | (movement pattern) | |
| Person-speed | (speed) | |
| Person-lateral distance | (distance) | |
| Person-longitudinal distance | (distance) | |
| Person-hand gesture | 0: gesture for EV to continue driving<br>1: gesture to stop EV<br>2: no gesture | current scenario (augmentation may not be required for 0 or 1 but may be needed if the person makes no gesture acknowledging the EV) |
| Person-eye contact | 0: yes<br>1: no | current scenario (augmentation may not be needed if the person makes eye contact acknowledging the EV) |
| Visibility | 0: no impairments<br>1: reduced (sun, fog, night, rain, snow) | current scenario (augmentation may be increased with decreased visibility) |
| Traction | 0: nothing on road<br>1: low (ice, wet) | current scenario (augmentation may be increased with decreased traction) |
| External noise level | 0: below threshold<br>1: above threshold | current scenario (augmentation (e.g., volume) may be increased with increased external noise) |
| EV driver-attention in manual mode | 0: attentive<br>1: inattentive | current scenario (augmentation may be increased for an inattentive driver) |
| EV driver-attention in automated driving | 0: attentive<br>1: inattentive | |

Table 1 is an example of inputs obtained (at block 210) to define a current scenario (at block 220). The effect of some of the inputs is also indicated. For example, when the input relating to traction indicates low traction due to snow on the road, augmentation of the standard audio output 150 may be more likely than if the input indicates nothing on the road to reduce traction. The conflict assessment indicated in Table 1 refers to using data from one or more sensors 130, 140 to monitor both longitudinal and lateral distance between the EV 100 and a person 110 in order to characterize the current scenario. As Table 1 makes clear, information about the EV 100 (e.g., speed, trajectory) and information about the person 110 (e.g., predicted path) are both needed to monitor longitudinal distance and lateral distance and, consequently, the potential for conflict (i.e., collision) and time to potential conflict. As previously noted, the data from one or more sensor may not be obtained or may not provide the input needed (e.g., dirt on a camera lens prevents a determination of whether there is anything on the road surface in order to assess traction). In this case, the most high-risk condition is assumed. Thus, for example, low traction is assumed in the exemplary case of the camera not indicating traction.

As previously noted, each current scenario and predefined scenario may indicate a risk level value in addition to the input values. The risk level associated with the current scenario may be based on the highest risk input value that is part of the scenario or may be based on a number of higher risk input values. The number of risk levels and the way that a risk level is assigned may vary according to alternate embodiments.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of augmenting audio output in an electric vehicle (EV), the method comprising:

obtaining, at a controller, inputs from one or more sensors, wherein the inputs include information about the EV and information about one or more persons outside the EV, wherein the information about the one or more persons outside the EV indicates a condition of the one or more persons, wherein the condition of the one or more persons comprises the one or more persons being visually impaired;

defining, using the controller, a current scenario based on the inputs;

determining, using the controller, whether the current scenario matches a predefined scenario among a set of predefined scenarios; and producing augmented audio output according to the predefined scenario, wherein an audio level of the augmented audio output is disproportionate to an action of the electric vehicle and is determined based at least in part on the condition of the one or more persons, and wherein the audio level of the augmented audio output is increased relative to the audio level of the augmented audio output for a non-visually impaired person.

2. The method according to claim 1, wherein the obtaining the inputs includes obtaining information about a potential conflict in a path of the EV and a path of one of the one or more persons, the information being based on lateral and longitudinal distance between the EV and the one of the one or more persons and the information including a time to the potential conflict.

3. The method according to claim 1, wherein the obtaining the inputs includes obtaining information about current conditions, the current conditions including traction and visibility.

4. The method according to claim 1, wherein obtaining the information about the one or more persons includes obtaining indications of ability and awareness.

5. The method according to claim 1, wherein the current scenario is expressed as a hexadecimal value.

6. The method according to claim 1, wherein the producing the augmented audio output includes modifying a standard audio output, the standard audio output being defined by attack, a time for initial ramp up from 0 to a peak audio level, decay, a time to reach a sustained level, sustain, an audio level during a main sequence, and release, a time for final ramp down from sustain back to 0 (ADSR) characteristics, and the modifying the standard audio output includes changing a start time of the standard audio output, changing a volume of the standard audio output, or changing a pitch, timbre, cadence, or the ADSR characteristics of the standard audio output.

7. The method according to claim 1, wherein the producing the augmented audio output includes adding earcons, which are audio representations additional to standard audio outputs by the EV.

8. The method according to claim 1, further comprising, based on the current scenario matching two or more of the set of predefined scenarios, selecting the augmented output corresponding with one of the two or more of the set of predefined scenarios with a highest risk level value.

9. The method according to claim 1, wherein the defining the current scenario includes selecting a default value to represent one or more parameters for which there is no corresponding one of the inputs, wherein the default value is based on a highest-risk condition being assumed.

10. The method according to claim 1, wherein the producing the augmented audio output includes emitting a sound outside the EV and cancelling the sound within the EV.

11. A system to augment audio output in an electric vehicle (EV), the system comprising:
one or more sensors; and
a controller configured to obtain inputs from one or more sensors, wherein the inputs include information about the EV and about one or more persons outside the EV, to define a current scenario based on the inputs, to determine whether the current scenario matches a predefined scenario among a set of predefined scenarios, and to produce augmented audio output according to the predefined scenario,
wherein the information about the one or more persons outside the EV comprises a behavior of the one or more persons, the behavior indicating a condition of the one or more persons, and
wherein an audio level of the augmented audio output is disproportionate to an action of the electric vehicle and is determined based at least in part on the condition of the one or more persons.

12. The system according to claim 11, wherein the controller is configured to obtain the inputs by obtaining information about a potential conflict in a path of the EV and a path of one of the one or more persons, the information being based on lateral and longitudinal distance between the EV and the one of the one or more persons and the information including a time to the potential conflict.

13. The system according to claim 11, wherein the controller is configured to obtain the inputs by obtaining information about current conditions, the current conditions including traction and visibility.

14. The system according to claim 11, wherein the controller is configured to obtain the information about the one or more persons by obtaining indications of ability and awareness.

15. The system according to claim 11, wherein the current scenario is expressed as a hexadecimal value.

16. The system according to claim 11, wherein the controller is configured to produce the augmented audio output by modifying a standard audio output, the standard audio output being defined by attack, a time for initial ramp up from 0 to a peak audio level, decay, a time to reach a sustained level, sustain, an audio level during a main sequence, and release, a time for final ramp down from sustain back to 0 (ADSR) characteristics, and modifying the standard audio output includes changing a start time of the standard audio output, changing a volume of the standard audio output, or changing a pitch, timbre, cadence, or the ADSR characteristics of the standard audio output.

17. The system according to claim 11, wherein the controller is configured to produce the augmented audio output by adding earcons, which are audio representations additional to standard audio outputs by the EV.

18. The system according to claim 11, wherein, based on the current scenario matching two or more of the set of predefined scenarios, the controller is configured to select the augmented output corresponding with one of the two or more of the set of predefined scenarios with a highest risk level value.

19. The system according to claim 11, wherein the controller is configured to define the current scenario by selecting a default value to represent one or more parameters for which there is no corresponding one of the inputs.

20. The system according to claim 11, wherein the controller is configured to produce the augmented audio output by emitting a sound outside the EV and cancelling the sound within the EV.

* * * * *